P. W. TOOHEY.
COASTER BRAKE.
APPLICATION FILED JUNE 27, 1908.
904,735.
Patented Nov. 24, 1908.
2 SHEETS—SHEET 1.
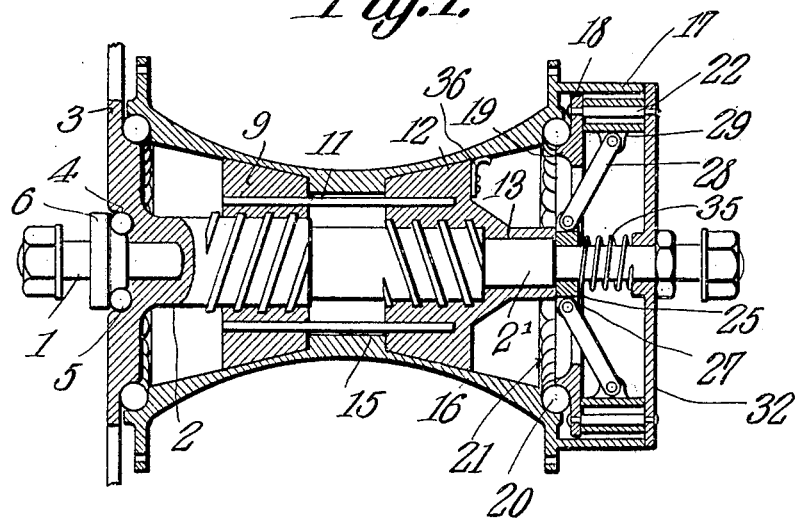
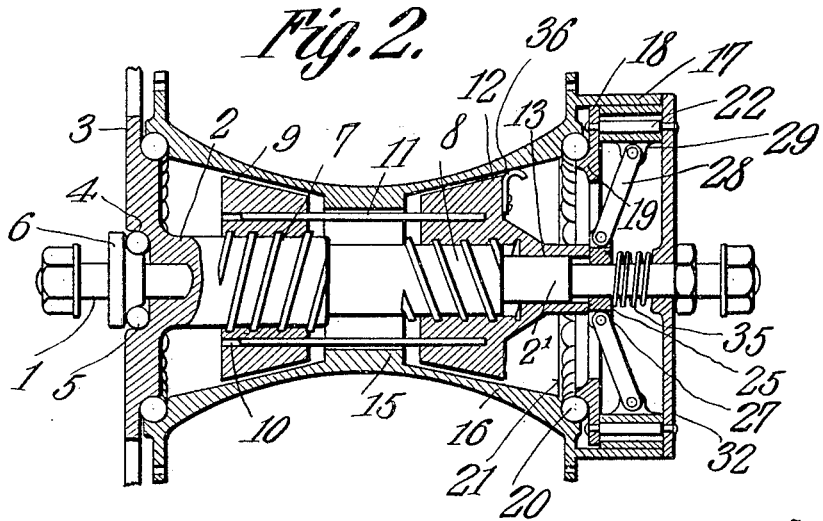
Witnesses
E. F. Hewitt
Herbert D. Lawson
Inventor
Patrick W. Toohey.
By C. A. Snow & Co.
Attorneys P. W. TOOHEY.
COASTER BRAKE.
APPLICATION FILED JUNE 27, 1908.
904,735.
Patented Nov. 24, 1908.
2 SHEETS—SHEET 2.
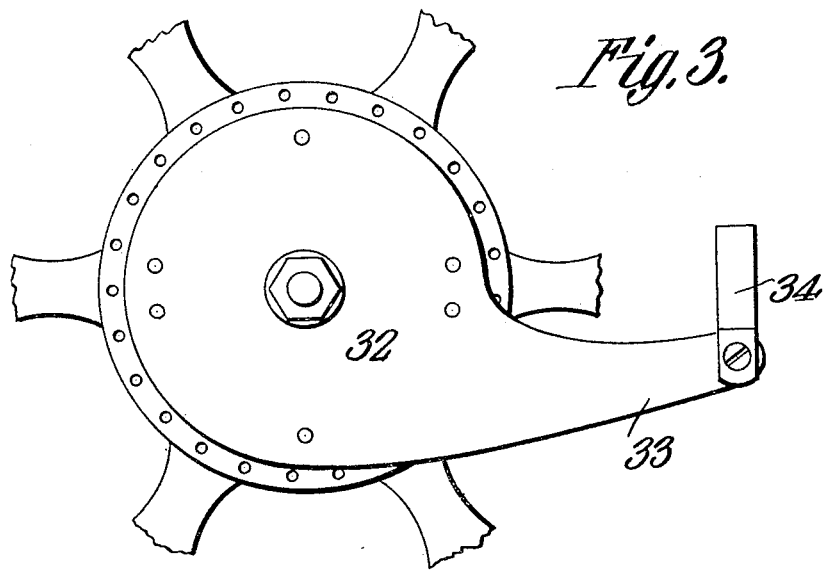
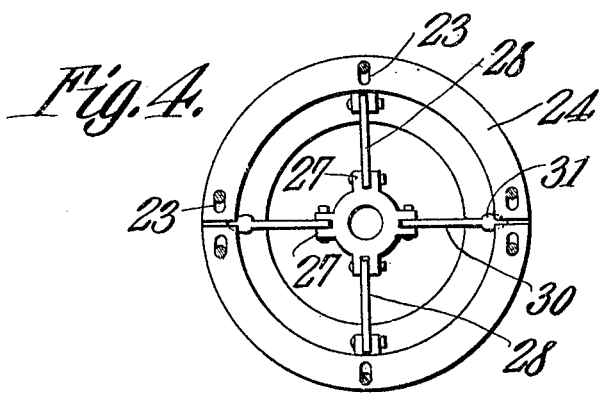
Witnesses
E. J. Stewart
Herbert D. Lawson
Inventor
Patrick W. Toohey.
By C. A. Snow & Co.
Attorneys
THE NORRIS PETERS CO., WASHINGTON, D. C.

UNITED STATES PATENT OFFICE.

PATRICK W. TOOHEY, OF COLORADO SPRINGS, COLORADO.

COASTER-BRAKE.

No. 904,735.  Specification of Letters Patent.  Patented Nov. 24, 1908.

Application filed June 27, 1908. Serial No. 440,705.

*To all whom it may concern:*

Be it known that I, PATRICK W. TOOHEY, a citizen of the United States, residing at Colorado Springs, in the county of El Paso and State of Colorado, have invented a new and useful Coaster-Brake, of which the following is a specification.

This invention relates to coaster brakes of that type used in connection with bicycles and similar vehicles and its object is to provide a device of this character which is simple, durable and compact in construction and which can be conveniently actuated by the pedals of the propelling mechanism so as to either rotate the drive wheel, free the same so as to permit coasting, or retard the rotation of the wheel by the application of a brake of novel form.

A further object is to provide a coaster brake the parts of which can be readily taken apart for the purpose of cleaning or repairing the same.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a longitudinal section through a wheel hub and through the coaster brake combined therewith, the mechanism being shown in position to actuate the wheel when power is applied to the shaft. Fig. 2 is a similar view showing the positions of the parts when the brake is applied. Fig. 3 is a side elevation of a hub having the present improvements applied. Fig. 4 is a face view of the brake shoes and the actuating sleeve and arms connected thereto.

Referring to the figures by characters of reference, 1 designates the axle of the wheel the same being designed to be suitably fastened to the frame of a bicycle and mounted on this axle is a stepped tubular shaft 2 extending from the center of a drive wheel 3, which may be in the form of a sprocket. A recess 4 is formed near the outer face of the sprocket at the center thereof and is designed to receive a series of anti-friction balls 5 held in place by means of a bearing cone 6 mounted on the shaft 1. That portion of the shaft 2 which is of greatest diameter is located adjacent the sprocket 3 and is provided with a quick thread 7. The adjoining portion of the tubular shaft 2 has an oppositely pitched quick thread 8. Mounted upon the thread 7 is a frusto-conical gripping jaw 9 having passages 10 extending therethrough and in which are slidably mounted the end portions of connecting rods 11. These rods extend parallel with axle 1 and shaft 2 and are secured within an oppositely disposed frusto-conical jaw 12 mounted on the threads 8. Jaw 12 has a reduced tubular extension 13 which is loosely mounted on the reduced end 2' of shaft 2, there being sufficient space between this extension and the small end of shaft 2 to permit jaw 12 to move a desired distance in the direction of jaw 9.

The two jaws 9 and 12 are disposed at opposite sides of an annular flange 15 formed within the central portion of a wheel hub 16, said flange constituting gripping surfaces against which the jaws 9 and 12 are designed to bear. The inner wall of the hub is tapered toward the flange 15 and is designed to be contacted by the peripheral portions of the jaws 9 and 12 simultaneously with the contact of said jaws and the flange 15.

A drum 17 is arranged concentrically upon one end of the wheel hub and is preferably integral therewith and disposed within this drum is a ring 18 having a flange 19 upon its inner face constituting means for retaining antifriction balls 20 within a recess 21 formed in the adjoining end of the hub 16. This ring has guide pins 22 extending perpendicularly therefrom and projecting through parallel slots 23 formed in the ends and center portions of oppositely disposed substantially semi-circular brake shoes 24. The arcs described by these shoes are similar to the arc of the inner surface of drum 17 so that the jaws can rest snugly throughout their lengths upon the inner surface of the drum.

A sleeve 25 is mounted on axle 1 and arranged upon the periphery of this sleeve are radial ears 27. Preferably four sets of these ears are employed and between two opposite sets are journaled the inner ends of arms 28 which extend outwardly at acute angles to axle 1 and are pivotally connected to ears 29 upon the centers of the inner surfaces of shoes 24. Spreading arms 30 extend from the other ears and have arrow-like heads 31 the points of which are positioned between the adjoining ends of shoes 24. These points preferably rest in small recesses formed in said ends so that the heads and shoe ends are maintained normally in a predetermined relative position. These recesses have been indicated by dotted lines in Fig. 4. A cap plate 32 is secured upon pins 22 and constitutes a closure for the drum 17. This cap plate has an arm 33 extending from it and designed to be secured in any preferred manner as by means of a clip 34 to the frame of the bicycle whereby the cap plate and all of the parts connected thereto are prevented from rotating upon the axle 1. A spring 35 is arranged upon the axle and within the drum and bears at its ends against the cap plate 32 and the sleeve 25 respectively, thus holding the shoes 24 normally out of frictional contact with the drum 17.

When the vehicle is driven forward in the usual manner by applying power to the wheel 3 the shaft 2 is rotated upon the fixed axle 1. It will be apparent that the rotating threads 7 and 8 will operate to shift the jaws 9 and 12 toward each other so as to bring them into frictional engagement with the tapered walls of the hub 16 and with the interior flange 15. The wheel hub 16 will therefore be caused to rotate with the jaws which frictionally engage the threads 7 and 8 and therefore rotate with the shaft 2. To release the wheel hub so as to permit the wheel to coast the drive wheel 3 is held stationary whereupon the hub 16, which is in frictional engagement with the jaws 9 and 12 will cause said jaws to rotate upon shaft 2 and threads 7 and 8 and move in opposite directions toward the ends of the hub. To apply the brake the drive wheel 3 is turned backward by reversing the driving mechanism and the threads 7 and 8 will therefore rotate within the jaws 9 and 12 and shift the tubular extension 13 against the sleeve 25. Said sleeve will be pressed against spring 35 and the arms 28 will operate as a toggle to press the shoes 24 into frictional engagement with the inner surface of drum 17. At the same time the spreading heads 31 will become wedged between the ends of the shoes, thus maintaining the ends of each shoe in a line parallel with the ends of the other shoe. When it is desired to drive the wheel forward again the drive wheel 3 is actuated in the usual manner and the shaft 2 is therefore rotated so as to cause threads 7 and 8 to draw the jaws 9 and 12 toward each other and into frictional engagement with the hub. This operation of course permits the spring 35 to withdraw the brake shoes from frictional engagement with the drum. The rods 11 serve to hold the jaws 9 and 12 against independent rotation, thus insuring the simultaneous contact of both jaws with the inner surface of the hub.

If deemed desirable any suitable means may be provided for insuring the rotation of the shaft 2 in jaws 9 and 10. In the drawings jaw 12 is shown provided with a spring 36 bearing against the inner face of shell 16.

What is claimed is:

1. In a device of the character described the combination with a hub having an interiorly relatively fixed gripping portion; of an axle extending through the hub, a tubular drive shaft mounted thereon and having oppositely pitched threads, and jaws mounted upon the respective threads and within the hub for frictional engagement with the opposite faces of the fixed gripping member.

2. In a device of the character described the combination with a hub having an interior relatively fixed gripping portion; of an axle extending through the hub, a tubular drive shaft mounted thereon and having oppositely pitched threads, jaws mounted upon the respective threads and within the hub for frictional engagement with the opposite faces of the fixed gripping member, a drum revoluble with the hub, a radially movable brake shoe within and disposed to contact with the drum, means for connecting said shoe with a relatively fixed support, and means operated by the movement of one of the jaws for actuating the brake shoe.

3. The combination with a hub having a relatively fixed annular gripping member therein; of a fixed axle extending through the hub, a tubular drive shaft mounted upon the axle and having oppositely pitched threads, oppositely disposed gripping jaws mounted upon the respective threads and disposed to be actuated thereby toward or from each other simultaneously, said jaws being disposed at opposite sides of the fixed gripping member, and means for preventing independent rotation of the jaws.

4. The combination with a hub, a fixed axle extending therethrough, and a tubular driving shaft upon the axle and within the hub, said shaft having oppositely pitched threads, oppositely disposed jaws mounted upon the respective threads for frictionally engaging the hub, a brake drum movable with the hub, oppositely disposed brake shoes within the drum, means for connecting the shoes with a relatively fixed supporting structure, and means actuated by one of the jaws for shifting said shoes relatively to the drum.

5. The combination with a hub and a drum thereon; of oppositely disposed brake shoes within the drum, means for connecting the shoes with a relatively fixed structure, a spring controlled toggle for simultaneously shifting said shoes radially, a fixed axle constituting a guide for the toggle, a tubular drive shaft upon the axle and within the hub, and means operated by the independent movement of the hub and shaft for shifting the toggle.

6. The combination with a hub and a drum thereon; of oppositely disposed brake shoes within the drum, means for connecting the shoes with a relatively fixed structure, a spring controlled toggle for simultaneously shifting said shoes radially, a fixed axle constituting a guide for the toggle, a tubular drive shaft upon the axle and within the hub, a jaw movably mounted upon the shaft, and means upon the shaft for simultaneously shifting said jaw in one direction to frictionally engage the hub and in an opposite direction to actuate the toggle.

7. The combination with a hub having a central relatively fixed gripping member and a drum at one end of the hub; of a relatively fixed axle, a tubular drive shaft journaled upon the axle, said shaft being stepped and having oppositely pitched threads, gripping jaws mounted upon the respective threads and at opposite sides of the fixed gripping member, a brake shoe within the drum, means for connecting the shoe with a relatively fixed supporting structure, and means actuated by one of the jaws for shifting the shoe.

8. The combination with a hub having a central relatively fixed gripping member and a drum at one end of the hub; of a relatively fixed axle, a tubular drive shaft journaled upon the axle, said shaft being stepped and having oppositely pitched threads, gripping jaws mounted upon the respective threads and at opposite sides of the fixed gripping member, oppositely disposed brake shoes within the drum, means for connecting the shoes with a relatively fixed supporting structure, a toggle connecting the same and guided by the axle, one of said jaws being shiftable against the toggle, and elastic means for holding the jaws normally in a predetermined position.

In testimony that I claim the foregoing as my own, I have hereto affixed my signature in the presence of two witnesses.

PATRICK W. TOOHEY.

Witnesses:
  J. L. CAFFEE,
  J. A. THOMAS.